United States Patent
Kang et al.

(10) Patent No.: US 9,998,897 B2
(45) Date of Patent: Jun. 12, 2018

(54) APPARATUS AND METHOD FOR TRANSMITTING CONTENT IN PORTABLE TERMINAL

(71) Applicant: Samsung Electronics Co., Ltd., Suwon-si, Gyeonggi-do (KR)

(72) Inventors: Hyuk Kang, Yongin-si (KR); Gi-Beom Kim, Yongin-si (KR); Hyeong-Seok Kim, Seoul (KR); Hyun-Chul Choi, Seoul (KR); Tae-Hun Lim, Yongin-si (KR); Duk-Ki Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 14/268,754

(22) Filed: May 2, 2014

(65) Prior Publication Data

US 2014/0335844 A1      Nov. 13, 2014

(30) Foreign Application Priority Data

May 7, 2013    (KR) ........................ 10-2013-0051185

(51) Int. Cl.
*H04W 4/00*     (2009.01)
*H04W 8/00*     (2009.01)
(Continued)

(52) U.S. Cl.
CPC ............. *H04W 4/80* (2018.02); *H04W 8/005* (2013.01); *H04W 52/028* (2013.01);
(Continued)

(58) Field of Classification Search
CPC ..... G06Q 30/0207; H04W 24/10; H04W 4/00
See application file for complete search history.

(56) References Cited

U.S. PATENT DOCUMENTS

2004/0259537 A1    12/2004   Ackley
2005/0221858 A1    10/2005   Hoddie et al.
(Continued)

FOREIGN PATENT DOCUMENTS

CN          1592481 A       3/2005
CN       101444116 A       5/2009
(Continued)

OTHER PUBLICATIONS

Bluetooth; Master Table of Contents & Compliance Requirements; Specification of the Bluetooth System Experience More; Specification vol. 0; Covered Core Package Version 4.0; Current Master TOC; Jun. 30, 2010.

(Continued)

*Primary Examiner* — Myron K Wyche
(74) *Attorney, Agent, or Firm* — Jefferson IP Law, LLP

(57) ABSTRACT

A method of transmitting contents in a portable terminal is provided. The method includes allowing a portable terminal of a transmitter to be connected to a portable terminal of a receiver by a control communication, allowing the portable terminal of the transmitter to select a type of the data transmission communication with the portable terminal of the receiver through the control communication, allowing the portable terminal of the transmitter to transmit setting data corresponding to the selected type of data transmission communication to the portable terminal of the receiver through the control communication, and allowing the portable terminal of the transmitter to be connected to the portable terminal of the receiver by the control communication and to transmit the content which are requested to be transmitted, to the portable terminal of the receiver.

20 Claims, 7 Drawing Sheets

(51) Int. Cl.
*H04W 52/02* (2009.01)
*H04W 88/06* (2009.01)
*H04W 8/24* (2009.01)
*H04W 12/08* (2009.01)

(52) U.S. Cl.
CPC .......... *H04W 52/0258* (2013.01); *H04W 8/24* (2013.01); *H04W 12/08* (2013.01); *H04W 88/06* (2013.01); *Y02D 70/00* (2018.01)

(56) References Cited

U.S. PATENT DOCUMENTS

| | | |
|---|---|---|
| 2007/0223444 A1 | 9/2007 | Foo et al. |
| 2007/0276849 A1 | 11/2007 | Konno et al. |
| 2009/0234728 A1 | 9/2009 | Willuns et al. |
| 2011/0086631 A1 | 4/2011 | Park et al. |
| 2011/0107117 A1 | 5/2011 | Jung et al. |
| 2012/0077433 A1* | 3/2012 | Walker ................ H04M 1/7253 455/41.1 |
| 2012/0230234 A1 | 9/2012 | Kim |
| 2013/0060653 A1* | 3/2013 | Sharkey ................ H04L 69/321 705/26.3 |
| 2013/0166399 A1* | 6/2013 | Awad ................ G06Q 30/0207 705/16 |
| 2013/0201915 A1* | 8/2013 | Wang ................ H04W 24/10 370/328 |
| 2014/0188348 A1* | 7/2014 | Gautama ................ B60W 10/30 701/48 |

FOREIGN PATENT DOCUMENTS

| | | |
|---|---|---|
| CN | 102684829 A | 9/2012 |
| EP | 2 587 868 A2 | 5/2013 |
| KR | 10-2011-0049121 A | 5/2011 |
| WO | 2009/022201 A1 | 2/2009 |
| WO | 2010/025744 A1 | 3/2010 |
| WO | 2013/052591 A1 | 4/2013 |

OTHER PUBLICATIONS

Bluetooth 4.0 (BLE) Single Mode Stack 1.0 API Documentation V.1.3, BlueGiga Technologies, Feb. 24, 2012, pp. 1-180, XP055233508, Retrieved from the Internet: URL: http://ezoelectro.narod.ru/doc-pdf/ble112/BLE_Stack_API_reference_v1 .3.pdf.

* cited by examiner

| AD Type | Byte | SERVICE | EMBODIMENT |
|---|---|---|---|
| TX Power Level | 1 | Signal strength measurement pathloss = TX PL - Adv_RSSI | TX Power level = +4 (dBm)<br>RSSI on Adv packet = -60 (dBm)<br>passloss = +65 dB |
| Shortened Local Name | 29 ↓ | Broadcast Name or Msg | Use of Preset Name Such as GT-8000 or Samsung Mobile |
| Random Target Address | 6 | 48-bit address | Predetermined Address Such as Samsung Mobile or Starbucks |
| Manufacturer Specific Data <<Protocol>> | 4 | Company Identifier Code and Protocol Identifier Code | (0x0075) Samsung Electronics<br>(0x0201) SSSP 1.0 |
| Manufacturer Specific Data <<Capability>> | 3 | Capability State (24bit bit-mask) | <<Communcation Bitmasks>><br>(01) Bluetooth BR/EDR<br>(02) Bluetooth AMP<br>(03) Bluetooth LE<br>(04) WiFi<br>(05) WiFi Direct<br>(06) WiFi Display<br>(07) DLNA (All-Share)<br>(08) NFC, RFID<br>(09) ZigBee, RF4CE<br>(10) Ant, Ant+<br>(11) Proprietary 2.4Ghz<br>(12) Sub-1Ghz<br>(13) Bonjour<br><<Sensor Bitmasks>><br>(14) GPS<br>(15) Accelerometer<br>(16) Gyroscope<br>(17) Geomagnetic<br>(18) Pressure<br>(19) Temperature<br>(20) Humidity<br>(21~24) Reserved<br><br>Informing that 01 to 08 can be Supported, Through Data of 0x0000FF |
| Manufacturer Specific Data <<Others>> | 2 | Phone State | <<Phone State Bitmasks>><br>(01) Silent mode<br>(02) Screen Rotation<br>(03) Power Saving<br>(04) Notification<br>(05) Mobile Data<br>(06) Driving mode<br>(07) Sync mode<br>(08~16) Reserved |

FIG.3B

| Category | Command | Option | Definition |
|---|---|---|---|
| Bearer, Sensor Specific | LE_Cmd_Bearer LE_Cmd_Sensor | <<Communcation Bitmasks>><br>(01) Bluetooth BR/EDR<br>(02) Bluetooth AMP<br>(03) Bluetooth LE<br>(04) WiFi<br>(05) WiFi Direct<br>(06) WiFi Display<br>(07) DLNA (All-Share)<br>(08) NFC, RFID<br>(09) ZigBee, RF4CE<br>(10) Ant, Ant+<br>(11) Proprietary 2.4Ghz<br>(12) Sub-1Ghz<br>(13) Bonjour<br><<Sensor Bitmasks>><br>(14) GPS<br>(15) Accelerometer<br>(16) Gyroscope<br>(17) Geomagnetic<br>(18) Pressure<br>(19) Temperature<br>(20) Humidity<br>(21~24) Reserved | (0x00) Power On<br>(0x01) Power Off<br>(0x02) Reset<br>(0x03) Visibility On<br>(0x04) Rename<br>(0x05~FF) Reserverd for future use |
| Music Play | LE_Cmd_Music | Target Apps | (0x01) Play/Pause<br>(0x02) Next<br>(0x03) Previous<br>(0x04) FF<br>(0x05) REW<br>(0x06) Stop<br>(0x07) Next Playlist<br>(0x08) Previous Playlist<br>(0x09) Shuffle setting advance<br>(0x0A) Repeat setting advance<br>(0x0B) Mute toggle<br>(0x0C~FF) Reserverd for future use |
| Remote Button | LE_Cmd_Button | System | (0x01) Home<br>(0x02) Menu<br>(0x03) Back<br>(0x04) Hold<br>(0x05) Volumn Up<br>(0x06) Volumn Down<br>(0x07) Enter<br>(0x08) Up Arrow<br>(0x09) Down Arrow<br>(0x0A) Left Arrow<br>(0x0B) Right Arrow<br>(0x0C~FF) Reserverd for future use |

FIG.3D

| Category | Command | Option | Definition |
|---|---|---|---|
| General | LE_Cmd_General | System | (0x01) LCD On<br>(0x02) LCD Off<br>(0x03) Lock Screen<br>(0x04) Unlock Screen<br>(0x05) Touch Input<br>(0x06) Pen Input<br>(0x07) Hovering<br>(0x08~FF) Reserverd for future use |
| Apps | LE_Cmd_Apps | Target Apps | (0x01) Excute an App<br>(0x02) Terminate an App |

FIG.3E

APPARATUS AND METHOD FOR TRANSMITTING CONTENT IN PORTABLE TERMINAL

CROSS-REFERENCE TO RELATED APPLICATION(S)

This application claims the benefit under 35 U.S.C. § 119(a) of a Korean patent application filed on May 7, 2013 in the Korean Intellectual Property Office and assigned Serial No. 10-2013-0051185, the entire disclosure of which is hereby incorporated by reference.

TECHNICAL FIELD

The present disclosure relates to a transmission of content. More particularly, the present disclosure relates to an apparatus and method for transmitting and sharing content using a wireless communication scheme, which can be more conveniently used and is capable of minimizing a consumption of electric power.

BACKGROUND

A portable terminal which is provided to a user in a form of a smart phone, a tablet PC and the like has provided various useful functions.

The portable terminal has included various kinds of communication modules, i.e. a long-range communication module supporting 3G/4G communications and the like, and a short-range communication module supporting Wi-Fi communication and the like, to provide various wireless communication techniques. For example, the portable terminal can perform data communication including data sharing with other portable terminals using the communication modules. However, data communication techniques have not provided a user with convenience during the data communication such as during data sharing because of various reasons now described.

When transmitting a file using communication techniques of the related art, a file to be transmitted is first selected, a transmission button is pressed, and potential recipients of the file are listed. A recipient is selected from the list, and a process of certifying the recipient is completed. When an apparatus corresponding to the recipient stays in a standby state capable of receiving the file, the file transmission starts. Accordingly, the process is very complicated and inconvenient.

Also, many users are not familiar with wireless transmission techniques such as Bluetooth, Wi-Fi Direct, Digital Living Network Alliance (DLNA), and the like. Further, users have difficulty in learning new technical features such as searching, scanning, pairing, bonding, Wi-Fi Protected Setup (WPS), Secure Simple Pairing (SSP), visibility, Discoverable, and the like. Accordingly, users cannot easily choose which wireless transmission technique is suitable for file transmission under certain circumstances. Therefore, it is problematic that a user transmits or receives a file using only wireless transmission techniques with which the user is familiar.

Further, in a case of sharing a file using a wireless transmission technique such as Bluetooth (ver. 3.0 or earlier) and Wi-Fi, either a Bluetooth module or a Wi-Fi module of the apparatus for transmitting and receiving the file must be active. Accordingly, where the apparatus is a portable terminal that is battery-operated, continuous consumption of electric power by the Bluetooth module or the Wi-Fi module is a problem. For example, since the activation of the Bluetooth module or the Wi-Fi module for data communication causes a significant consumption of standby electric current, portable terminals such as a smart phones or a tablet PC can be inefficient. Further, in a wireless transmission technique such as Bluetooth or Wi-Fi, there is a problem in that it sometimes takes several tens of seconds, for example thirty seconds, of scanning to identify an object that is to receive the file.

In order to address the above-mentioned inconveniences, a technique of transmitting data after performing Out Of Band (OOB) pairing using Near Field Communication (NFC) and the like is utilized. However, this technique results in an increase in power consumption in a data receiving apparatus since the data receiving apparatus must continuously remain in a standby state in order to receive data.

Accordingly, there is a need for an improved apparatus and method for transmitting and sharing content using a wireless communication scheme, which can be more conveniently used and is capable of minimizing a consumption of electric power.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above- mentioned problems and/or disadvantages and to provide at least the advantages described below. Accordingly, an aspect of the present disclosure is to provide an apparatus and method for transmitting content in a portable terminal, which are capable of maximizing usability by simplifying and automating wireless communication functions so that a user can use them conveniently, while minimizing a consumption of electric power which is caused by using the wireless communication functions.

In accordance with an aspect of the present disclosure, a method of transmitting content in a portable terminal is provided. The method of transmitting content in a portable terminal includes allowing a portable terminal of a transmitter to be connected to a portable terminal of a receiver by a control communication when the portable terminal of the transmitter receives a request for transmission of content, allowing the portable terminal of the transmitter to select a type of data transmission communication with the portable terminal of the receiver through the control communication, allowing the portable terminal of the transmitter to transmit setting data corresponding to the selected type of the data transmission communication to the portable terminal of the receiver through the control communication, so that the portable terminal of the receiver changes a setting corresponding to the selected type of the data transmission communication, and allowing the portable terminal of the transmitter to be connected to the portable terminal of the receiver by the control communication and to transmit the requested content to the portable terminal of the receiver.

In accordance with another aspect of the present disclosure, an apparatus for transmitting content in a portable terminal is provided. The apparatus for transmitting content in a portable terminal includes a short-range communication module including a plurality of communication modules which have a communication module for a control communication module and a data communication module, and a controller configured to connect the apparatus to the portable terminal of the receiver which receives the content, for the control communication by using the communication module for the control communication module when receiving a request of a content transmission, to select a communication module for a data transmission communication with the portable terminal of the receiver from the plurality of communication modules through the control communication, to transmit setting data corresponding to the selected communication module for the data transmission communication to the portable terminal of the receiver through the control communication so that the portable terminal of the receiver changes a setting corresponding to the selected communication module for the data transmission communication, to connect the selected communication module for the data transmission communication to the portable terminal of the receiver, and to control the apparatus to transmit the content which is requested to be transmitted to the portable terminal of the receiver through the connected communication module for the data transmission communication.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3B is a view illustrating a second example of an advertising data format which is broadcast from the portable terminal according to an embodiment of the present disclosure;

FIGS. 3D and 3E are views illustrating examples of a format of setting data transmitted in the process of transmitting content according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
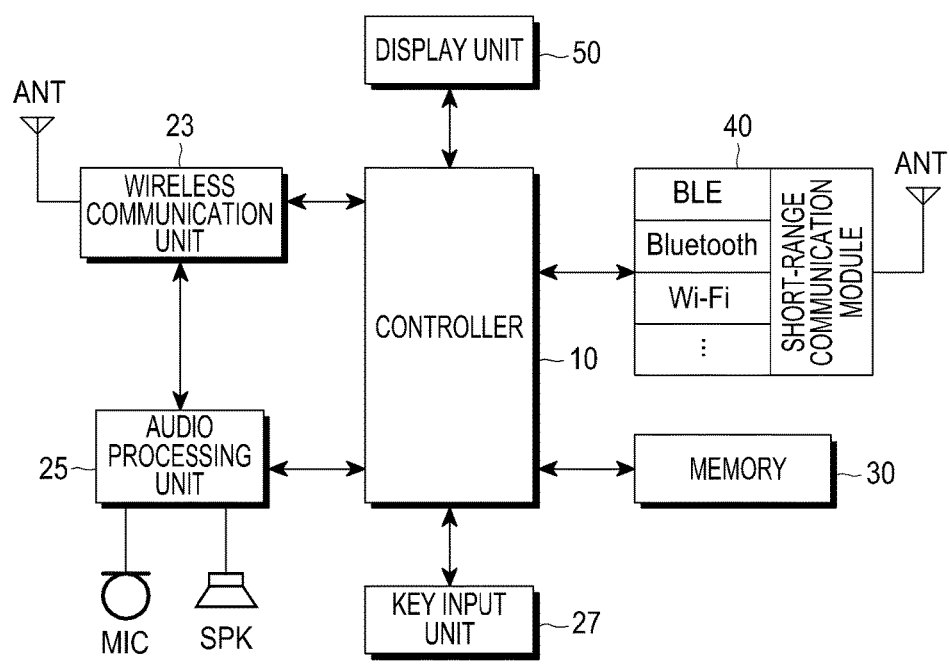
FIG. 1 is a schematic block diagram illustrating a portable terminal according to an embodiment of the present disclosure.

FIG. 1 is a schematic block diagram illustrating a portable terminal according to an embodiment of the present disclosure.

Referring to FIG. 1, a portable terminal according to an embodiment of the present disclosure is an electronic device which can be carried conveniently in terms of weight and size. Some examples of the portable terminal according to the present disclosure may include feature phones and electronic devices such as a smart phone and a tablet PC, which are operated by an operating system such as bada, Tizen, Windows, iOS, Android, and the like, although this list is not meant to be exhaustive. Additionally, the portable terminal according to an embodiment of the present disclosure may include a portable computer, a digital camera, a video phone, and the like.

It will be obvious to a person of ordinary skill in the art that the portable terminal is not limited to the above-mentioned electronic devices. Further, embodiments of the present disclosure may be applied to an electronic device, for example a desktop PC, which is difficult to carry. Accordingly, it will be obvious to a person of ordinary skill in the art that embodiments of the present disclosure can be applied to electronic devices including portable apparatuses and fixed apparatuses.

A radio transmission and reception unit 23 includes a Radio Frequency unit (RF unit) and a modem. The RF unit includes a RF transmitter for upconverting and amplifying a frequency of transmitted signals, and a RF receiver for amplifying a low noise of received signals and downconverting a frequency of the signals. The modem includes a transmitter for encoding signals to be transmitted and a receiver for demodulating and decoding signals received from the RF unit.

An audio processing unit 25 is may comprise a codec, and the codec may include a data codec and an audio codec. The data codec processes a packet data and the like, and the audio codec processes audio signals such as a voice, a sound of multimedia files, and the like. The audio processing unit 25 converts digital audio signals received from the modem into analog signals through the audio codec to reproduce a voice or sound, or converts analog audio signals received from a microphone into digital audio signals through the audio codec to transmit the digital audio signals to the modem. The codec of the audio processing unit 25 may be separately equipped to the portable apparatus, or included in a controller 10. Otherwise, the audio processing unit 25 may be included in the controller 10.

The controller 10 according to various embodiments of the present disclosure can notify a user that a communication control device, e.g. a remote control, is connected to the portable terminal, i.e. a Bluetooth Low Energy (BLE) device is connected to the portable terminal, through the audio processing unit 25 in a form of sound information.

A key input unit 27 may include keys necessary for an input of number and letter information, function keys necessary for setting various functions, a touch pad, and the like. In a case where a display unit 50 is established in a form of a touch screen, the key input unit 27 may include a reduced number of keys, and the display unit 50 can substitute for part of key input functions of the key input unit 27.

A memory 30 includes a program memory and data memories, of which the program memory has a program for controlling a general operation of a portable terminal stored therein. The memory 30 may further include an external memory such as a Compact Flash (CF) memory, a Secure Digital (SD) memory, a Micro Secure Digital (Micro-SD) memory, a Mini Secure Digital (Mini-SD) memory, an Extreme Digital (xD) memory, a Memory Stick (MS) memory, and the like. Further, the memory 30 may include a disk type of storage unit such as a Hard Disk Drive (HDD) and a Solid State Disk (SSD).

The memory 30 according to various embodiments of the present disclosure may store (or temporarily store) content, and a white list to be described later. Content stored (or temporarily stored) in the memory 30 may refer to data which users can transmit and receive (share with one another) by using their portable terminals, for example contact address files with an extension name such as .vcf, and multimedia files having an extension name such as .jpg, .avi, .mp3, and the like.

A short-range communication module 40 provides a short-range wireless communication function.

The short-range communication module 40 according to various embodiments of the present disclosure may include a plurality of communication modules such as a Bluetooth module, a BLE module, a Wi-Fi module, and the like. The short-range communication module 40 according to an embodiment of the present disclosure may include an Infrared Data Association (IrDA) module, a Near Field Communication (NFC) module, a ZIGBEE module, an ANT module, and an RFID module. Referring to FIG. 1, the short-range communication module 40 is shown including one antenna. However, the short-range communication module 40 may include a number of antennas corresponding to the number of communication modules.

Alternatively, the BLE module may be a short-range communication module consistent with Bluetooth 4.0, and operates in a low energy mode compared to the Bluetooth modules of version 3.0 or earlier. The BLE module has a feature of minimizing battery consumption of a portable terminal even though it is continuously activated, and may be provided along with or as a substitute for the traditional Bluetooth module of version 3.0 or earlier.

Moreover, the BLE module may be associated with the controller 10 to broadcast advertising data including status information of the portable terminal, for example, a portable terminal of a transmitter and a portable terminal of a receiver. The BLE module is described in more detail in the following paragraphs.

The display unit 50 includes a Liquid Crystal Display (LCD) or an Organic Light Emitting Diode (OLED) and outputs various pieces of display information generated in the portable terminal. The display unit 50 may include an electrostatic touch screen, a resistive touch screen and the like, through which a user uses only the touch screen 50, or the touch screen 50 and the key input unit 40 together to operate the portable terminal, for example, in a manner of touching buttons. Further, the display unit 50 may include a digitizer. The display unit 50 may include only one of, or both, the digitizer and the touch screen to process an input of a user.

The controller 10 controls overall operations of the portable terminal according to various embodiments of the present disclosure, and converts and controls the operation of the portable terminal according to a user input through the key input unit 27 or the display unit 50. Alternatively, the controller 10 according to an embodiment of the present disclosure controls the overall operations of a portable terminal at a transmitter side, or the overall operations of a portable terminal at a receiver side with respect to the performance of a content transmission method in the portable terminal. For example, the controller 10 according to an embodiment of the present disclosure controls a series of operations relating to the performance of the content transmission method in the portable terminal The content transmission method includes the enabling a portable terminal of a transmitter to be connected with a portable terminal of a receiver for a control communication when the portable terminal of the transmitter is requested to transmit content, allowing the portable terminal of the transmitter to select a type of data transmission communication with the portable terminal of the receiver through the control communication, allowing the portable terminal of the transmitter to transmit setting data corresponding to the selected type of data transmission communication to the portable terminal of the receiver through the connected control communication, enabling the portable terminal of the receiver to change a setting thereof corresponding to the selected type of data transmission communication, and allowing the portable terminal of the transmitter to be connected to the portable terminal of the receiver for the selected data transmission communication, so as to transmit the requested content to the portable terminal of the receiver through the data transmission communication.

Alternatively, although devices such as a camera module and a Digital Media Broadcasting (DMB) receiver which may be included in the portable terminal are not shown in FIG. 1, it will be obvious to a person of ordinary skill in the art that the devices (not shown) also are included in the portable terminal according to various embodiments of the present disclosure to provide corresponding functions. For example, in an embodiment of the present disclosure, the content shared (transmitted to and received from) with the portable terminal of the transmitter and the portable terminal of the receiver may be stationary images or video files taken by the camera module, or broadcasting video files which are recorded using the DMB receiver.

Figure 2:
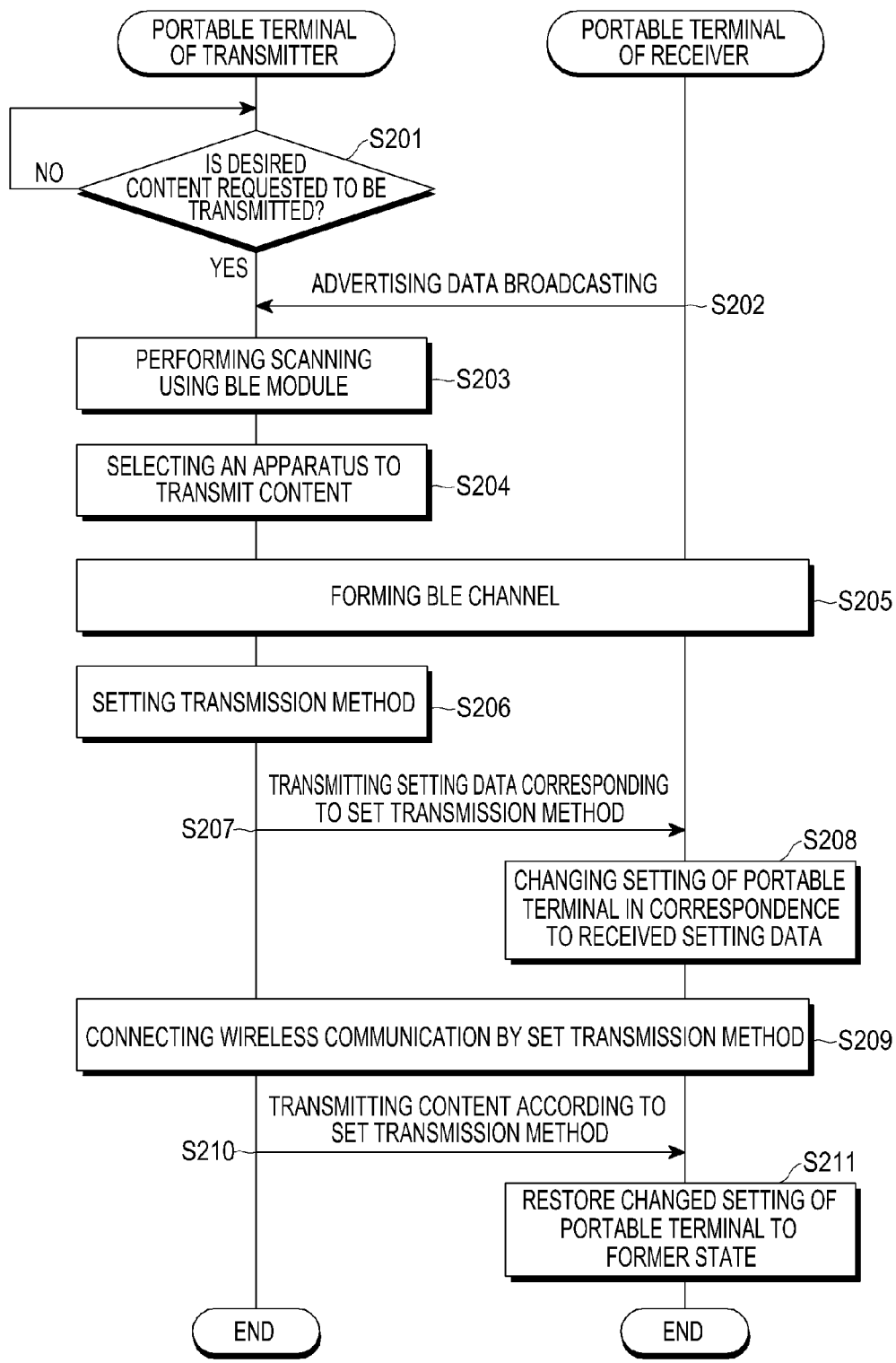
FIG. 2 is a flowchart illustrating a process of transmitting content according to an embodiment of the present disclosure.

FIG. 2 is a flowchart illustrating a process of transmitting content according to an embodiment of the present disclosure.

Figure 3A:
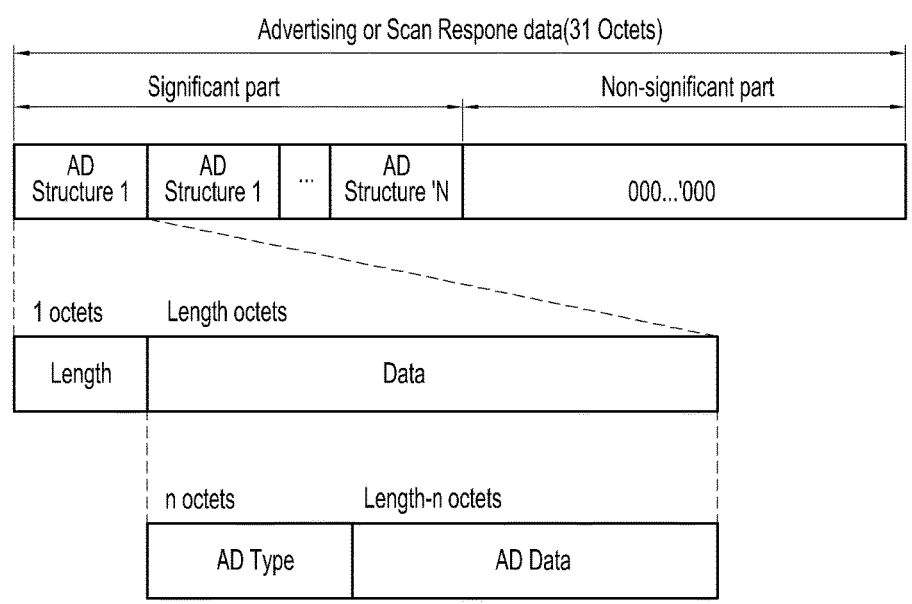
FIG. 3A is a view illustrating a first example of an advertising data format which is broadcast from the portable terminal according to an embodiment of the present disclosure.
Figure 3C:
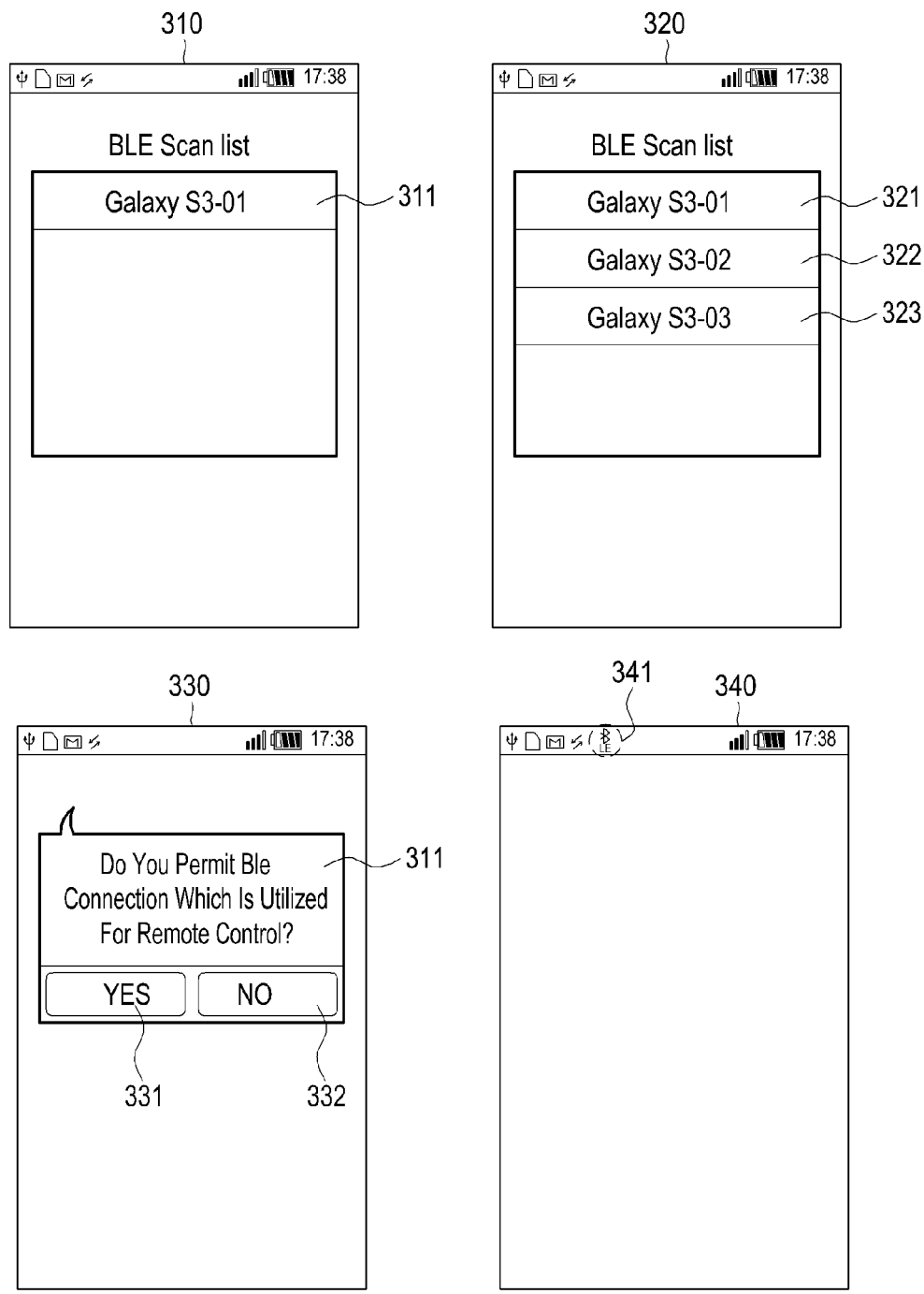
FIG. 3C is a view illustrating a process of transmitting content according to an embodiment of the present disclosure.

FIG. 3A is a view illustrating a first example of an advertising data format which is broadcast from the portable terminal according to an embodiment of the present disclosure. FIG. 3B is a view illustrating a second example of an advertising data format which is broadcast from the portable terminal according to an embodiment of the present disclosure. FIG. 3C is a view illustrating a process of transmitting content according to an embodiment of the present disclosure. FIGS. 3D and 3E are views illustrating examples of a format of setting data transmitted in the process of transmitting content according to an embodiment of the present disclosure. Various embodiments of the present disclosure will be described with reference to the drawings.

Although the portable terminal, for example, the portable terminal of the transmitter and the portable terminal of the receiver, is described as one structural element for the convenience of this description, it will be obvious to a person of ordinary skill in the art that the primary operation is the controller 10 of the portable terminal and structural elements included in the portable terminal that are subject to instructions of the controller. Further, although the portable terminal of the transmitter and the portable terminal of the receiver are distinguished and described with relation to files for the convenience of the description, it will be obvious to a person of ordinary skill in the art that the portable terminal of the transmitter also can perform the operation of the portable terminal of the receiver, and on the contrary, the portable terminal of the receiver also can perform the operation of the portable terminal of the transmitter.

At operations S201 and S202, the portable terminal of the transmitter identifies that a user has requested the portable terminal to transmit desired content, and receives advertising data which is broadcast from the portable terminal When receiving a request of the content transmission from the user, for example, a request of sharing content with the portable terminal of the receiver, the portable terminal of the transmitter activates the BLE module which is a low-energy short-range communication module so as to receive the advertising data which is broadcast from the other portable terminals including the portable terminal of the receiver.

Various embodiments of the present disclosure utilize the advertising data of the BLE module with a low-energy attrition rate. Therefore, the portable terminals, for example the portable terminal of the transmitter and the portable terminal of the receiver, according to an embodiment of the present disclosure broadcast the advertising data through the BLE module which is a low-energy short-range communication module. Therefore, the companion portable terminal receiving the advertising data can obtain status information of the portable terminal The portable terminal according to an embodiment of the present disclosure stores the status information of itself in detail data of the advertising data to broadcast it, for example, in an AD structure 1 to an AD structure N. The advertising data and the status information will be described with reference to FIGS. 3A and 3B.

Referring to FIG. 3A, the maximum size of the advertising data provided in the BLE is 31 bytes, and the status information of the portable terminal is included in a plurality of the detail data, for example the AD structure 1 to the AD structure N, and can be broadcast.

Referring to FIG. 3B, even though the many pieces of information are included in the detail data of the advertising data, the embodiment of the present disclosure utilizes data corresponding to an AD type such as a TX power level, a shortened local name, a random target address, a manufacturer specific data <<protocol>>, a manufacturer specific data <<capability>>, a manufacturer specific data <<others>>, and the like, among the many pieces of information.

Here, the status information includes information on whether a communication status of the BLE module of the portable terminal is preferred, which wireless communication function is supported by using which protocol, a current operation mode, and the like.

For example, the portable terminal of the receiver (or the portable terminal of the transmitter) broadcasts information on an electric field, i.e. RSSI, of the BLE module through the data having the AD type of the TX power level.

Further, the portable terminal of the receiver (or the portable terminal of the transmitter) broadcasts information on device names through data having the AD type of the shortened local name.

Further, the portable terminal of the receiver (or the portable terminal of the transmitter) broadcasts a predetermined address such as Samsung Mobile or Starbucks through data having the AD type of a random target address. The data of the random target address is utilized in an application of a white list described later as well as in an address for a connection of the BLE communication.

Further, the portable terminal of the receiver (or the portable terminal of the transmitter) broadcasts information on an identification of a manufacturer, e.g., Samsung Electronics Co., Ltd., or information on a communication protocol, e.g., SSIP 1.0, through data having the AD type of a manufacturer specific data <<protocol>>.

In addition, the portable terminal of the receiver (or the portable terminal of the transmitter) broadcasts information on supported wireless communications among a plurality of wireless communications listed by 01 to 13, and also broadcasts information on usable sensors among a plurality of sensitive sensors listed by 14 to 20, through data having the AD type of a manufacturer specific data <<capability>>.

For example, when the advertising data in which information of AD data having 0x0000FF is stored in the AD type of the manufacturer specific data <<capability>> is broadcast, it is possible to inform that the wireless communications functions including (01) Bluetooth BR/EDR, (02) Bluetooth AMP, (03) Bluetooth LE (BLE), (04) Wi-Fi, (05) Wi-Fi Direct, (06) Wi-Fi Display, (07) DLNA (all-share) and (08) NFC, RFID, may be supported.

Furthermore, the portable terminal of the receiver (or the portable terminal of the transmitter) broadcasts information on an operation mode of the portable terminal, e.g., a silent mode, a screen rotation mode, a power saving mode, a notification mode, a mobile data transmission/reception mode, a driving mode, a sync mode, and the like, through data having the AD type of a manufacturer specification data <<others>>.

Alternatively, because the advertising data has the maximum size of 31 bytes, information on the shortened local name having the maximum size of 31 bytes may not be included in the advertising data in an embodiment of the present disclosure. For example, the advertising data is generated by using data corresponding to the AD types of the TX power level having a size of 1 byte, the random target address having a size of 6 bytes, the manufacturer specific data <<protocol>> having a size of 4 bytes, the manufacturer specific data <<capability>> having a size of 3 bytes, and the manufacturer specific data <<others>>.

At this time, the portable terminal which receives the broadcasted advertising data requests the portable terminal which broadcasts the advertising data, to transmit information having the AD type of the shortened local name which is not included in the advertising data due to the size thereof, and obtains the information.

For example, an apparatus, i.e. the portable terminal of the receiver, that broadcasts the advertising data sets the information on the shortened local name as data to be transmitted in response to a scan (scan_RSP) when the advertising data is generated. Then, in a case where the received advertising data lacks necessary status information, an apparatus, i.e. the portable terminal of the transmitter, which receives the broadcast advertising data, requests an advertising data including the necessary status information, i.e. shortened local name, by using the same advertising channel through an additional request (scan_REQ) at operation S203, and receives the advertising data including the necessary information through the respond (scan_RSP).

Furthermore, even though the controller of the portable terminal of the receiver enters a sleep mode, the portable terminal of the receiver (or the BLE module of the portable terminal of the transmitter) broadcasts the advertising data at a predetermined period, and responds to the scanning of the portable terminal of the transmitter. At this time, according to whether the controller enters the sleep mode, a period in which the advertising data is broadcast may be variable.

At operations S203 to S205, the portable terminal of the transmitter performs a scanning using the BLE module and displays detected apparatuses. Then, when a user selects an apparatus to which the content is transmitted, the portable terminal of the transmitter connects the BLE communication.

In an embodiment of the present disclosure, the portable terminal of the transmitter can perform the scanning by using the BLE module when the user requests the portable terminal of the transmitter to transmit the content, or when the advertising data which is broadcast by another portable terminal, i.e. the portable terminal of the receiver.

At this time, the portable terminal of the transmitter can scan the neighboring portable terminal of the receiver, i.e. an advertiser broadcasting the advertising data, by using scanning parameters indicated in Table 1 below.

TABLE 1

| Set Scan Command parameters | Definition |
| --- | --- |
| LE_Scan_Type | (0x00) Passive Scanning (default) |
|  | (0x01) Active scanning (SCAN_REQ) |
| LE_Scan_Interval | Range: 2.5 ms~10.24 s (Default 10 ms) |
| LE_Scan_Window | Range: 2.5 ms~10.24 s (Default 10 ms) |
| Own_Address_Type | Public(default) or Random Target Address |
| Scanning_Filter_Policy | (0x00) Accept all advertisement packets (default). |
|  | (0x01) Ignore advertisement packets from devices not in the White List Only. |

The portable terminal of the transmitter displays to a user a list of one or more apparatuses which are scanned and detected by the BLE module and receives a user's selection for an apparatus to which the content are to be transmitted, so as to connect the BLE communication with the apparatus selected by the user. At this time, the portable terminal of the transmitter according to an embodiment of the present disclosure may selectively display a list of apparatuses satisfying the RSSI in a certain range, when a list of the apparatuses scanned and detected by the BLE module is displayed.

Referring to FIG. 3C, when only one apparatus is scanned and detected by the BLE module, assuming that it is the portable terminal of the receiver to which the portable terminal of the transmitter transmits the content, indicated by a reference numeral 311 on a display screen 310, the portable terminal of the transmitter connects the BLE communication with the apparatus, i.e., the portable terminal of the receiver, which is selected by the user, by inputting a touch input for a menu indicated by 311.

As shown in a display screen 320, when a plurality of apparatuses 321, 322, and 323 are detected as a result of scanning by using the BLE module, the user can sequentially select the plural apparatuses 321, 322 and 323, and the BLE communication is sequentially connected with the plurality of selected apparatuses so that the BLE communication of 1:N can be performed.

Here, since the portable terminal of the transmitter can broadcast the advertising, like the portable terminal of the receiver, it is assumed that the portable terminal of the transmitter temporarily stops broadcasting the advertising data when the advertising data is received from the portable terminal of the receiver, and performs the scanning.

Further, the portable terminal of the transmitter displays a list of only apparatuses having an RSSI value in a certain range, among the scanned apparatuses. That is, the portable terminal of the transmitter displays the minimal number of apparatuses, thereby improving the convenience with which the user selects an apparatus.

In an embodiment of the present disclosure, the BLE communication is used as control communication by which the portable terminal of the transmitter, i.e. an apparatus requesting the connection of the BLE communication, remotely controls the portable terminal of the receiver, i.e. an apparatus receiving and permitting the connection of the BLE communication. Accordingly, in an embodiment of the present disclosure of FIG. 2, the BLE communication of the portable terminal of the transmitter with the portable terminal of the receiver is carried out when the portable terminal of the transmitter requests the portable terminal of the receiver to permit the BLE communication and the portable terminal of the receiver permits the BLE communication.

At this time, the connection of the BLE communication of the portable terminal of the transmitter with the portable terminal of the receiver may be carried out without approval of the user of the portable terminal of the receiver. However, it is assumed that the connection of the BLE communication can be carried out only when the user of the portable terminal of the receiver approves.

In an embodiment of the present disclosure, the apparatus, i.e. the portable terminal of the receiver which is invited for the BLE communication, informs the user of a request of another terminal, i.e. the portable terminal of the transmitter, to connect the BLE communication and requests the user to approve, as indicated by a reference numeral 330 in FIG. 3. Then, the portable terminal of the receiver, i.e. the apparatus invited to connect the BLE communication, connects the BLE communication with the portable terminal of the transmitter according to the user's decision, i.e. an input touch for a menu 331 of menus 331 and 332.

When the BLE communication for the remote control is connected, the portable terminals of the transmitter and the receiver inform each user of the connection of the BLE communication in a form of sound, vibration, or visual information. In an embodiment, the connection of the BLE communication is displayed in a form of visual information through an interface such as an indicator bar (or a quick panel) 341 on a display screen 340, as shown in FIG. 3C. Further, an interface for control of the BLE connection, including menus of disconnect, cancel, reject, filter, and the like may be provided so that the user may set the connected BLE communication.

Alternatively, in an embodiment of the present disclosure, the portable terminal of the transmitter and the portable terminal of the receiver have a white list which is previously stored therein, and selectively perform a series of operations for a connection of the BLE communication through the white list.

The portable terminal, i.e. the portable terminal of the transmitter and the portable terminal of the receiver, according to an embodiment of the present disclosure may use an open address (BD_ADDR) or a MAC Address for a connection of communication with another terminal, i.e. for a connection of the BLE communication as a control communication, but may connect the BLE communication by using the random target address included in the advertising data shown in FIG. 3B. Accordingly, the portable terminals, i.e. the portable terminal of the transmitter and the portable terminal of the receiver, according to an embodiment of the present disclosure can store in advance the white list generated on the basis of the random target address.

For example, the portable terminal of the transmitter previously composes the white list before scanning for the connection of the BLE communication, and identifies the advertising data broadcast by the plurality of apparatuses to ignore the advertising data of the apparatuses which do not correspond to the random target address included in the white list.

Further, the portable terminal of the receiver can ignore a request of an apparatus for the connection of the BLE communication that is not included in the white list. Therefore, it is possible to prevent unnecessary operations of the portable terminal of the transmitter and the portable terminal of the receiver, (for example the operation of the controller), thereby minimizing a consumption of electric current and securing the privacy of the user of the portable terminal.

Alternatively, the apparatus which is managed by using the white list (or the apparatus which is registered in the white list) may be a portable terminal such as a smart phone. However, the apparatus may include service providers to which an address for certification, i.e. random target address, is given. The service providers may include a device service provider, a business service provider, a social service provider, and the like. For example, the random target address is distributed to the service providers which are certified through a certification process, and it makes the BLE connection of the portable terminal, i.e. the portable terminals of the transmitter and the receiver, achievable with the service providers only when the BLE connection is necessary.

An example of the device service provider includes apparatuses of a certain manufacturer, e.g. Samsung Electronics Co. Ltd., using the same protocol, such as a smart phone, a smart TV, a smart appliance and the like. Further, an example of the business service provider includes companies such as Starbucks, SK Energy, Costco, CGV, KORAIL, and the like, which provide commercial services including advertisement, coupons, ordering, ticketing, and the like. Furthermore, an example of the social service provider includes companies such as Facebook, Twitter, Foursquare, and the like, which provide social network services.

Referring back to FIG. 2, at operations S206 to S208 the portable terminal of the transmitter sets up a method of transmitting the content and transmits setting data corresponding to a transmission method which is set to the portable terminal of the receiver. The portable terminal of the receiver changes and applies the setting of the portable terminal in correspondence to the setting data which is received.

When connected to the portable terminal of the receiver to perform the control communication (BLE communication), the portable terminal of the transmitter has to set (select) a communication method to be used for a transmission of the content, i.e. a communication for a transmission of data such as the content.

The portable terminal of the transmitter according to an embodiment of the present disclosure also broadcasts the advertising data by using the BLE module, like the portable terminal of the receiver. It is already described that the advertising data includes information on which wireless communication function a corresponding portable terminal supports by using which protocol, and a current operation mode of the portable terminal.

Accordingly, the portable terminal of the transmitter analyzes the advertising data of the portable terminal of the receiver, and identifies a type of wireless communication function which the portable terminal of the transmitter and the portable terminal of the receiver can utilize in common so as to select a certain wireless communication function.

For example, a wireless communication function having the fastest transmission rate is selected from the wireless communication functions which are utilized in common. For example, when the wireless communication functions of the Bluetooth module (version 3.0 or earlier) and the Wi-Fi module are utilized in common, the Wi-Fi module having a transmission rate relatively faster than the Bluetooth module may be selected.

However, the portable terminal of the transmitter identifies a size property of a content to be transmitted, and selects a wireless communication function from the wireless communication functions which are utilized in common according to the size property. For example, in a case where the wireless communication functions of the Bluetooth module (version 3.0 or earlier) and the Wi-Fi are utilized in common, if the size of the content is smaller than a predetermined size, e.g. 1 Mb, the Bluetooth module (version 3.0 or earlier) having a small latency, i.e. transmission delay rate may be selected. If the size of the content is larger than the threshold size, i.e. 1 Mb, the Wi-Fi module having a rapid transmission rate may be selected. The transmission of the content using the Bluetooth module is disadvantageous in view of the transmission rate, but is advantageous in view of the latency. Therefore, if the size of the content to be transmitted is small, a transmission method using the Bluetooth module is preferable.

When a type of the wireless communication function is selected or determined as described above, the portable terminal of the transmitter identifies whether the selected wireless communication function is activated. If the wireless communication function is not activated, the portable terminal of the transmitter activates the wireless communication function. The portable terminal of the transmitter transmits the setting data shown in FIGS. 3D and 3E to the portable terminal of the receiver by using the connected BLE communication so that the portable terminal of the receiver activates the selected wireless communication function. For example, when the Wi-Fi module is selected and the Wi-Fi module, i.e. the wireless communication function using the Wi-Fi module, is activated in the portable terminal of the transmitter, the portable terminal of the transmitter transmits the setting data so that the Wi-Fi module is activated in the portable terminal of the receiver.

FIGS. 3D and 3E are views illustrating examples of a format of setting data transmitted in the process of transmitting content according to an embodiment of the present disclosure. Referring to FIGS. 3D and 3E, the portable terminal of the transmitter can transmit the setting data to the portable terminal of the receiver in order to control at least one of the wireless communication functions of 01 to 13 and sensors of 14 to 20 in the portable terminal of the receiver, as shown through a category of a bearer and a sensor specific. The portable terminal of the receiver changes its setting based on the received setting data.

For example, when receiving the setting data for turning the Wi-Fi module on from the portable terminal of the transmitter, the portable terminal of the receiver identifies whether the Wi-Fi module thereof is activated. If the Wi-Fi module is activated, the portable terminal of the receiver ignores the setting data. If the Wi-Fi module is not activated, the portable terminal of the receiver activates the Wi-Fi module.

At operations S209 to S211, the portable terminal of the transmitter is connected to the portable terminal of the receiver through the wireless communication by the set transmission method. The content which is requested to be transmitted is transmitted to the portable terminal of the receiver according to the set transmission method. When completing the reception of the content, the portable terminal of the receiver restores the changed setting thereof to the former state.

The portable terminal of the transmitter sets the transmission method in the previous operations and transmits the setting data, which corresponds to the set transmission method, to the portable terminal of the receiver. A series of operations are performed for connecting the communication by the set transmission method, i.e. the selected wireless communication function, which can be automatically performed in the portable terminal of the transmitter.

For example, when the set transmission method is the Bluetooth module (version 3.0 or earlier), and the portable terminals of the transmitter and the receiver are activated, the portable terminal of the transmitter automatically performs a series of processes including a pairing so as to complete the connection with the portable terminal of the receiver by the Bluetooth module (version 3.0 or earlier). As another example, if the set transmission method is the Wi-Fi Direct module, the portable terminals of the transmitter and the receiver automatically perform a series of operations including a device discovery, a service discovery, and a group generation so that the connection of the Wi-Fi Direct module can be achieved between the portable terminals.

When the wireless communication is connected according to the set transmission method, the portable terminal of the transmitter transmits the content which is requested to be transmitted to the portable terminal of the receiver by using the connected wireless communication.

When or after the portable terminal of the transmitter transmits the content, the setting data described with reference to FIGS. 3D and 3E can be transmitted through the BLE which is a control communication. At this time, the transmitted setting data includes a control parameter for controlling the transmitted content. Alternatively, the control parameter may be transmitted at operations S207, and S210, or after operation S210.

Referring to FIGS. 3D and 3E, as shown in categories of music play, remote button, general and apps, the portable terminal of the transmitter transmits the content, and transmits instructions for controlling the transmitted content as the setting data as shown in FIGS. 3D and 3E. For example, the portable terminal can control a reproduction of the transmitted content, e.g. music files, by means of the instructions such as play/pause, next, previous, FF, REW, stop, and the like. As shown through a category of Apps, the portable terminal of the transmitter can transmit instructions for executing a certain application to the portable terminal of the receiver.

When the portable terminal of the transmitter completes the transmission of the content, the portable terminal of the receiver restores the setting, which is changed to receive the content at operation S208, to the former state.

For example, having changed the setting of the portable terminal so that the Wi-Fi module in a state of non-activation is activated to receive the content, the portable terminal of the receiver restores the setting of the portable terminal after completing the reception of the content, so that the Wi-Fi module returns to the initial non-activation state.

Alternatively, in an embodiment of the present disclosure as described above, the portable terminal of the transmitter is connected with the portable terminal of the receiver by the BLE communication for the remote control, selects a type of data communication through the BLE communication, and transmits the content through the connection of the data communication, i.e. a connection of the Wi-Fi.

However, various embodiments of the present disclosure can be applied to a case where the portable terminal of the transmitter is far apart from the portable terminal of the receiver. Although communication using a short-range communication module such as the BLE module and the Wi-Fi module is impossible, the embodiment can be applicable. For example, the portable terminal of the transmitter is connected to the portable terminal of the receiver by way of a relay server, e.g. a cloud server, to perform communication for the remote control and the data transmission, thereby carrying out an embodiment of the present disclosure as described above.

The present disclosure provides an apparatus and method for transmitting content in a portable terminal, which are capable of maximizing usability by simplifying and automating wireless communication functions so that a user can use them conveniently, while minimizing the consumption of electric power which is caused by using the wireless communication functions.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. A method of transmitting content in a transmission side portable terminal, the method comprising:
connecting to at least one receiving side portable terminal by a control communication interface for a control communication for controlling the at least one receiving side portable terminal when a request for transmission of the content is input;
selecting a type of a data transmission communication for transmitting the content to the at least one receiving side portable terminal based on status information on the at least one receiving side portable terminal received from the at least one receiving side portable terminal through the connected control communication interface;
turning on a data transmission communication interface corresponding to the selected type of the data transmission communication;
transmitting, to the at least one receiving side portable terminal through the connected control communication interface, setting data for turning on a data transmission communication interface of the at least one receiving side portable terminal corresponding to the selected type of the data transmission communication;
connecting to the at least one receiving side portable terminal by the data transmission communication interface corresponding to the selected type of the data transmission communication; and
transmitting the content to the at least one receiving side portable terminal through the connected data transmission communication interface.

2. The method as claimed in claim 1, further comprising turning on a Bluetooth low energy (BLE) interface corresponding to the control communication when the request for transmission of the content is input.

3. The method as claimed in claim 1,
wherein the control communication interface includes a Bluetooth low energy (BLE),
wherein the connecting to the at least one receiving side portable terminal by the control communication interface comprises:
detecting the at least one receiving side portable terminal by performing a scanning through the BLE interface when the request for transmission of the content is input;
receiving advertising data broadcast from the detected at least one receiving side portable terminal through the BLE interface;
displaying a list of the detected at least one receiving side portable terminal based on the status information included in the advertising data; and
when one from the list of the detected at least one receiving side portable terminal is selected, connecting with the selected receiving side portable terminal for the control communication by using the BLE interface.

4. The method as claimed in claim 3, wherein the displaying of the list of the detected at least one receiving side portable terminal comprises selectively displaying at least one receiving side portable terminal satisfying a predetermined received signal strength indication (RSSI) from among the list of the detected at least one receiving side portable terminal.

5. The method as claimed in claim 3,
wherein the displaying of the list of the detected at least one receiving side portable terminal comprises selectively displaying at least one receiving side portable terminal included in a first white list stored in the transmitting side portable terminal, and,
wherein the first white list is generated on a basis of an address necessary for a connection of the control communication.

6. The method as claimed in claim 1, wherein the selecting of the type of the data transmission communication for transmission of the content comprises:
identifying a type of at least one data transmission communication which is utilized in common along with the at least one receiving side portable terminal based on the status information; and
selecting a type of data transmission communication with a fastest transmission rate from among the identified type of at least one data transmission communication.

7. The method as claimed in claim 1, wherein the selecting of the type of the data transmission communication for transmitting the content comprises:
identifying a type of at least one data transmission communication which is utilized in common along with the at least one receiving side portable terminal based on the status information;
identifying a data size of the content;
selecting a type of data transmission communication having a smallest latency from among the identified the type of at least one data transmission communication, when the identified data size of the content is smaller than a threshold data size; and
selecting a type of data transmission communication having the fastest transmission rate from among the identified the type of the at least one data communication, when the identified data size of the content is identical to or larger than the threshold data size.

8. The method as claimed in claim 1, further comprising turning off the data transmission communication interface, when completing the transmission of the content.

9. A transmission side portable terminal for transmitting content, the transmission side portable terminal comprises:
a short-range communication interface including a plurality of communication interfaces which have a control communication interface for a control communication and at least one data transmission communication interface for data transmission communication; and
at least one processor configured to:
connect to at least one receiving side portable terminal by the control communication interface for controlling the at least one receiving side portable terminal when a request for transmission of the content is input,
select a type of a data transmission communication for transmitting the content to the at least one receiving side portable terminal based on status information on the at least one receiving side portable terminal received from the at least one receiving side portable terminal through the connected control communication interface,
turn on a data transmission communication interface corresponding to the selected type of the data transmission communication,
transmit, to the at least one receiving side portable terminal through the connected control communication interface, setting data for turning on a data transmission communication interface of the at least one receiving side portable terminal corresponding to the selected type of the data transmission communication, connect to the at least one receiving side portable terminal by the data transmission communication interface corresponding to the selected type of the data transmission communication, and transmit the content to the at least one receiving side portable terminal through the connected data transmission communication interface.

10. The transmission side portable terminal as claimed in claim 9, wherein the communication interface for the control communication includes a Bluetooth low energy (BLE) interface, and wherein the at least one processor is further configured to turn on the BLE interface when a request for transmission of content is input.

11. The transmission side portable terminal as claimed in claim 10, wherein the at least one processor is further configured to:

detect the at least one receiving side portable terminal by performing a scanning through the BLE interface when the request for transmission of the content is input, receive advertising data broadcast from the detected at least one receiving side portable terminal through the BLE interface, display a list of the detected at least one receiving side portable terminal based on the status information included in the advertising data, and when one from the list of the detected at least one receiving side portable terminal is selected, connect with the selected receiving side portable terminal for the control communication by using the BLE interface.

12. The transmission side portable terminal as claimed in claim 10, wherein the status information includes electric field information of the BLE interface of the receiving side portable terminal, an address necessary for a connection of the control communication, a type of communication protocol, a type of wireless communication function supported by the receiving side portable terminal, and information on a current operation mode.

13. The transmission side portable terminal as claimed in claim 9, wherein the at least one processor is further configured to:

identify a type of at least one data transmission communication which is utilized in common along with the at least one receiving side portable terminal based on the status information, and select a type of data transmission communication with a fastest transmission rate from among the identified type of at least one data transmission communication.

14. The transmission side portable terminal as claimed in claim 9, wherein the at least one processor is further configured to:

identify a type of at least one data transmission communication which is utilized in common along with the at least one receiving side portable terminal based on the status information, identify a data size of the content, select a type of data transmission communication having a smallest latency from among the identified the type of the at least one data transmission communication, when the identified data size of the content is smaller than a threshold data size, and select a type of data transmission communication having the fastest transmission rate from among the identified the type of the at least one data communication, when the identified data size of the content is identical to or larger than the threshold data size.

15. The transmission side portable terminal as claimed in claim 9, wherein the at least one processor is further configured to turn off the data transmission communication interface, when completing the transmission of the content.

16. A method of receiving content in a receiving side portable terminal, the method comprising:

broadcasting status information on the receiving side portable terminal;

connecting to a transmitting side portable terminal by a control communication interface for a control communication for controlling the receiving side portable terminal when receiving a request for connection of the control communication from the transmitting side portable terminal;

receiving, from the transmitting side portable terminal trough the connected control communication interface, setting data for turning on a data transmission communication interface of the receiving side portable terminal corresponding to a type of the data transmission communication selected by the transmitting side portable terminal based on the status information;

turning on the data transmission communication interface of the receiving side portable terminal corresponding to the selected type of the data transmission communication;

connecting to the transmitting side portable terminal by the data transmission communication interface corresponding to the selected type of the data transmission communication; and receiving the content form the transmitting side portable terminal through the connected data transmission communication interface.

17. The method as claimed in claim 16, further comprising turning off the data transmission communication interface, when completing the receipt of the content.

18. The method as claimed in claim 16, wherein the control communication interface includes a Bluetooth low energy (BLE) interface, wherein the connecting to the transmitting side portable terminal by the control communication interface for the control communication comprises connecting with the transmitting side portable terminal for the control communication by using the BLE interface when the transmitting side portable terminal is included in a white list stored in the receiving side portable terminal, and wherein the white list is generated on a basis of an address necessary for a connection of the control communication.

19. The transmission side portable terminal as claimed in claim 9, wherein the at least one processor is further configured to transmit, to the at least one receiving side portable terminal through the connected control communication interface, a control parameter including instructions for controlling the transmitted content in the at least one receiving side portable terminal.

20. The transmission side portable terminal as claimed in claim 19, wherein the setting data includes the control parameter, and wherein the instructions comprise instructions for controlling a reproduction of the transmitted content or executing an application associated with the transmitted content in the at least one receiving side portable terminal.

* * * * *